United States Patent [19]
Tsuchiyama

[11] Patent Number: 6,069,568
[45] Date of Patent: *May 30, 2000

[54] MULTI-ADDRESS RADIO DISPLAY PAGER HAVING ON/OFF SETTING MODE FOR DISPLAYING ANCILLARY DATA

[75] Inventor: Kinya Tsuchiyama, Shizuoka, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/550,987

[22] Filed: Oct. 31, 1995

[30] Foreign Application Priority Data

Mar. 20, 1995 [JP] Japan .................................. 7-060872

[51] Int. Cl.⁷ ...................................................... G08B 5/22
[52] U.S. Cl. ................................ 340/825.44; 340/825.22; 455/38.1
[58] Field of Search ......................... 340/825.44, 825.66, 340/825.27, 825.22, 825.11, 825.07, 825.36, 825.52, 825.55, 825.69, 825.72; 455/38.2, 38.1

[56] References Cited

U.S. PATENT DOCUMENTS

| | | | |
|---|---|---|---|
| 4,422,071 | 12/1983 | de Graaf | 340/825.44 |
| 4,894,649 | 1/1990 | Davis | 340/825.44 |
| 5,185,604 | 2/1993 | Nepple et al. | 340/825.44 |
| 5,294,922 | 3/1994 | Akahori | 340/825.44 |
| 5,398,021 | 3/1995 | Moore | 340/825.27 |

*Primary Examiner*—Michael Horabik
*Assistant Examiner*—Anthony A. Asongwed
*Attorney, Agent, or Firm*—Sughrue, Mion, Zinn, Macpeak & Seas, PLLC

[57] ABSTRACT

A multi-address radio display pager includes a display unit, a memory and at least one manually operated key for receiving a paging signal containing one of multiple calling addresses and a message which is classified as one of data groups according to the calling addresses, the message being accompanied with a set of ancillary data items. A controller is responsive to the operation of a menu key for providing a display of the data groups to allow each one of the displayed data groups to be selected by a user and providing a display of the ancillary data items of the selected data group instead of the data groups to allow each one of the displayed ancillary dam items to be selected by the user and a display of ON/OFF indications of the selected ancillary data item to allow the user to determine an ON/OFF state for each of the selected ancillary data items. The determined ON/Off state of each selected ancillary data item is stored into the memory corresponding to the selected data group. During a page receiving mode, the controller is responsive to a paging signal for classifying a message contained therein as one of the data groups, and provides a display of the message in addition to a display of ancillary data items of the message in accordance with ON/OFF states stored in the memory corresponding to the classified data group.

13 Claims, 3 Drawing Sheets

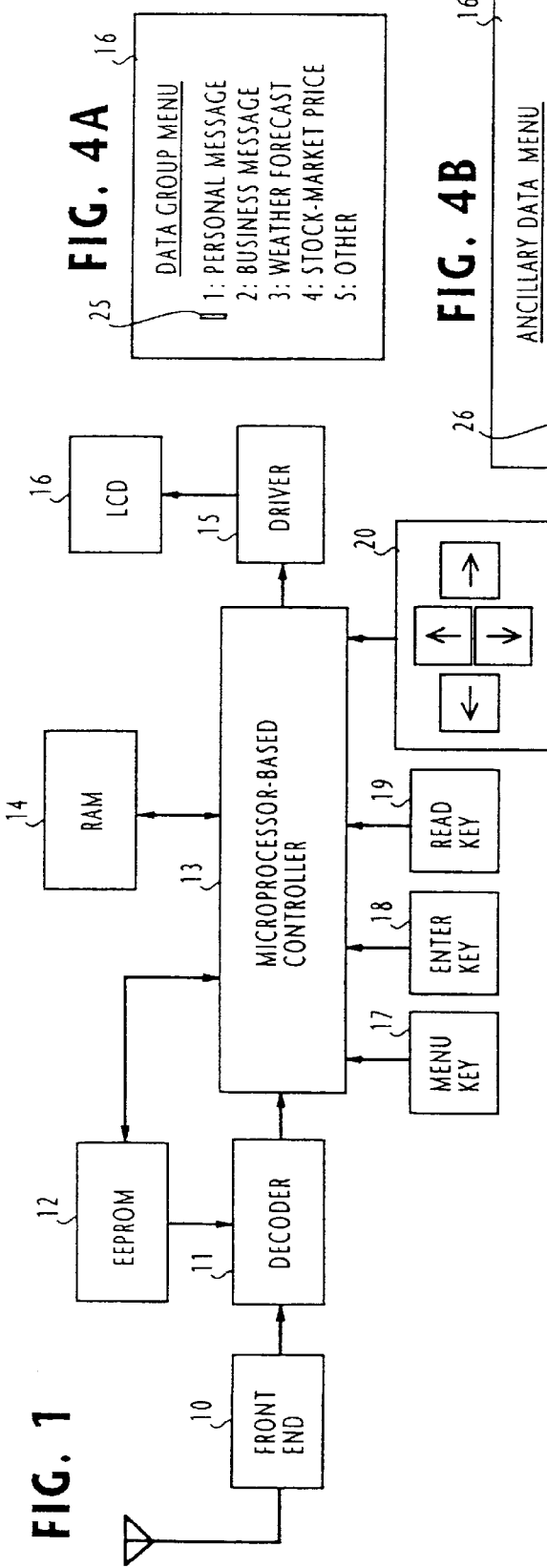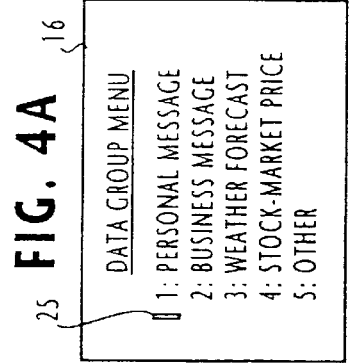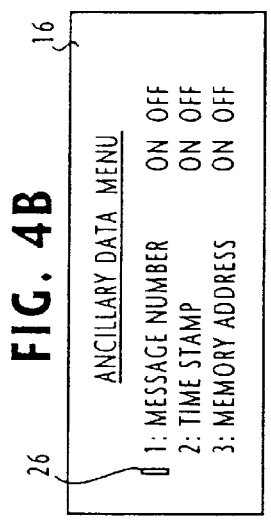

MULTI-ADDRESS RADIO DISPLAY PAGER HAVING ON/OFF SETTING MODE FOR DISPLAYING ANCILLARY DATA

BACKGROUND OF THE INVENTION

1. Field of the Invention

The present invention relates generally to selective calling radio display pagers, and more particularly to a multi-address radio pager for receiving messages of different data groups, wherein each message is accompanied with ancillary data.

2. Description of the Related Art

It is known that a multiple address calling system allows a radio display pager to receive messages of different classes of information, or data groups such as personal messages, business messages, stock-market prices and so forth by assigning multiple calling addresses to the pager. A plurality of ancillary data such as message number, time stamp and memory address are transmitted along with the message and displayed simultaneously or sequentially in a position adjacent the location where the message is displayed. However, the pager is designed to generate ancillary data when a paging signal is received. Thus, it can occur that the same ancillary data are displayed twice. Since the screen size of the display pager is limited, such duplication is a waste of the display area which would otherwise be used for more important information.

SUMMARY OF THE INVENTION

It is therefore an object of the present invention to provide a multi-address radio display pager which eliminates the wastage of display area.

According to the present invention, there is provided a radio display pager having a plurality of calling addresses for receiving a paging signal containing one of the calling addresses and a message which is classified as one of a plurality of data groups according to the calling addresses, the message being accompanied with a plurality of ancillary data items. The radio pager includes a display unit, a memory and at least one manually operated key. A controller is responsive to an operation of a manually operated key, during a setting mode, for providing a display of the data groups on the display unit to allow each one of the displayed data groups to be selected by a user and providing a display of the ancillary data items of the selected data group on the display unit instead of the data groups to allow each one of the displayed ancillary data items to be selected by the user and a display of ON/OFF indications of the selected ancillary data item on the display unit to allow the user to determine an ON/OFF state for each of the selected ancillary data items The determined ON/Off state of each of the selected ancillary data items is stored into the memory corresponding to the selected data group. During a page receiving mode, the controller is responsive to receipt of a paging signal for classifying a message contained therein as one of the data groups, providing a display of the message on the display unit and a display of ancillary data items of the received paging signal in accordance with ON/OFF states stored in the memory corresponding to the classified dam group.

BRIEF DESCRIPTION OF THE DRAWINGS

The present invention will be described in further detail with reference to the accompanying drawings, in which:

FIG. 1 is a block diagram of a radio display pager embodying the present invention.

FIG. 2 shows a list of data groups corresponding to multiple calling addresses, data subgroups and their message contents;

FIG. 4A shows a menu of the data groups displayed on a liquid crystal display during a user setting mode;

FIG. 4B shows a menu of ancillary data items of a selected data group displayed on the LCD during the user setting mode;

FIG. 5 shows the contents of the EEPROM of the pager stored during the user setting mode for indicating enable/display status of ancillary data items of each data group.

DETAILED DESCRIPTION

Figure 3:
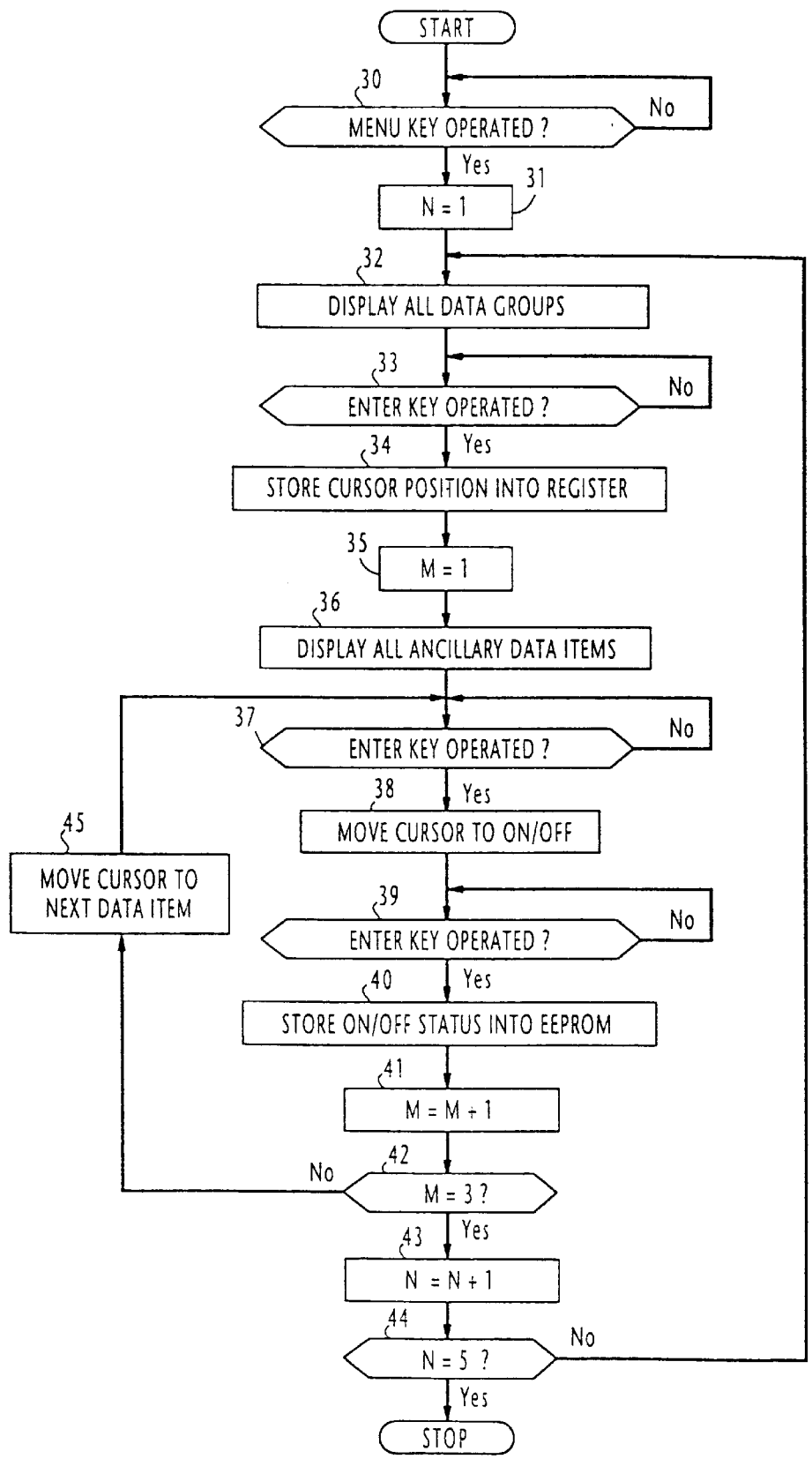
FIG. 3 is a flowchart illustrating the operation of a microprocessor-based controller during a user setting mode.

Referring now to FIG. 1, a multi-address radio display pager of this invention has a front end 10 for receiving a broadcast radio paging signal and converting it to a baseband signal. The paging signal contains a preamble followed by a sequence of frames each containing one of the multiple calling address codewords assigned to the pager and a message codeword. Each frame may additionally contain ancillary data such as message numbers, time-stamps and message addresses. A plurality of calling addresses are assigned to the pager for receiving messages of different data groups and stored in an EEPROM (electrically erasable programmable read-only memory) 12. As a typical sample, the pager has five calling addresses for receiving messages of five data groups.

The received calling address codeword is decoded in a decoder 11 and compared with each of the calling addresses stored in the EEPROM 12. If a corresponding calling address is detected in the received signal, the decoder 11 supplies its accompanying message codeword to a microprocessor-based controller 13, which is connected to a random access memory 14 to store the message codeword and the accompanying ancillary data in an entry corresponding to the calling address of the received paging signal. The contents of RAM 14 are sorted according to their calling addresses. Controller 13 is further connected to the EEPROM 12 to store data which are manually set by the pager's owner. Manually operated keys such as "menu" key 17, "enter" key 18, "read" key 19 and a set of cursor movement keys 20 are also connected to the controller 13 to allow the user to store ancillary data during a user setting mode. Controller 13 supplies an output through a LCD driver 15 to a liquid crystal display unit 16. An annunciator, not shown, may be connected to the controller to alert the user when a particular paging signal is received.

As illustrated in FIG. 2, message codewords are typically classified into five groups including a personal message group 1, a business message group 2, weather forecast data 3, stock-market price data 4, and other items 5. The personal message group 1 and the business message group 2 are each divided into sub-groups A, B, C and D.

The controller 13 operates in accordance with the flowchart of FIG. 3 during a user setting mode.

In FIG. 3, a setting mode of the controller 13 begins with decision step 30 which chocks to see if the menu key 17 is operated. If so, flow proceeds to step 31 to initialize variable N to 1. At step 32, a group menu is displayed on the LCD 16 to show the list of data groups 1 to 5 as illustrated in FIG. 4A with a cursor 25 shown blinking in a position adjacent one of the displayed data groups. The user is allowed to operate one of the up and down cursor movement keys to move the cursor to a desired data group. When it is confirmed that the cursor 25 is positioned adjacent a desired data group, the user then operates the enter key 18 to indicate that the desired data group is selected. The selection of a desired data group is detected at step 33. Exit then is to step 34 to store the position of the cursor 25 when the enter key is operated into a register, not shown, to record the selected data group.

At step 35, a variable M is initialized to 1 and flow advances to step 36 where the controller 13 provides a display of an ancillary data menu on the LCD 16, instead of the data group menu, to show the list of all ancillary data items of the data group selected at step 33 including a message number, a time stamp and a message address and a column of "on/off" entries corresponding to the ancillary data item as shown in FIG. 4B with a cursor 26 shown blinking in a position adjacent one of the ancillary data items. Cursor 26 can be moved vertically for pointing the ancillary data items as well as horizontally for pointing the "on" or "off" entry. The "on/off" entries are used for storing enable or disable commands into the EEPROM 12 for enabling or disabling the display of the corresponding ancillary data. With the ancillary data items being displayed, the user moves the up and down cursor movement keys and when it is positioned adjacent a desired ancillary data item, the enter key 18 is depressed by the user. When the operation of the enter key 18 is detected at step 37, flow proceeds to step 38 to move the cursor 23 to the corresponding "on/off" entry. The user then operates the left and right cursor movement keys to move the cursor 26 to the "on" or "off" position and then operates the enter key 18, which is detected at step 39. Exit then is to step 40 where the controller 13 determines the address of the EEPROM 12 from the position of cursor 25 stored in the register at step 34 and the position of cursor 26 established at step 39 and stores the on/off (enable/disable) status of the ancillary data item of the desired data group into the EEPROM 12 as illustrated in FIG. 5.

A sequence of operations for an ancillary data item of a data group has been completed. The controller 13 now increments the variable M by 1 at step 41. Flow proceeds to step 42 to check to see if the variable M is equal to 3. If not, flow proceeds to step 45 to move the cursor 26 to the next data item and returns to step 37 to repeat the process until M=3. When M=3, flow proceeds to step 43 to increment the variable N by 1 and advances to step 44 to check to see if N=5. If not, flow returns to step 32 to display all data groups again to allow the user to perform the same process on the next data group. The above process will continue until N=5.

If the user desires to terminate the setting mode before the controller automatically reaches the end of the routine, a power switch, not shown, may be momentarily operated to turn off the pager.

Figure 6:
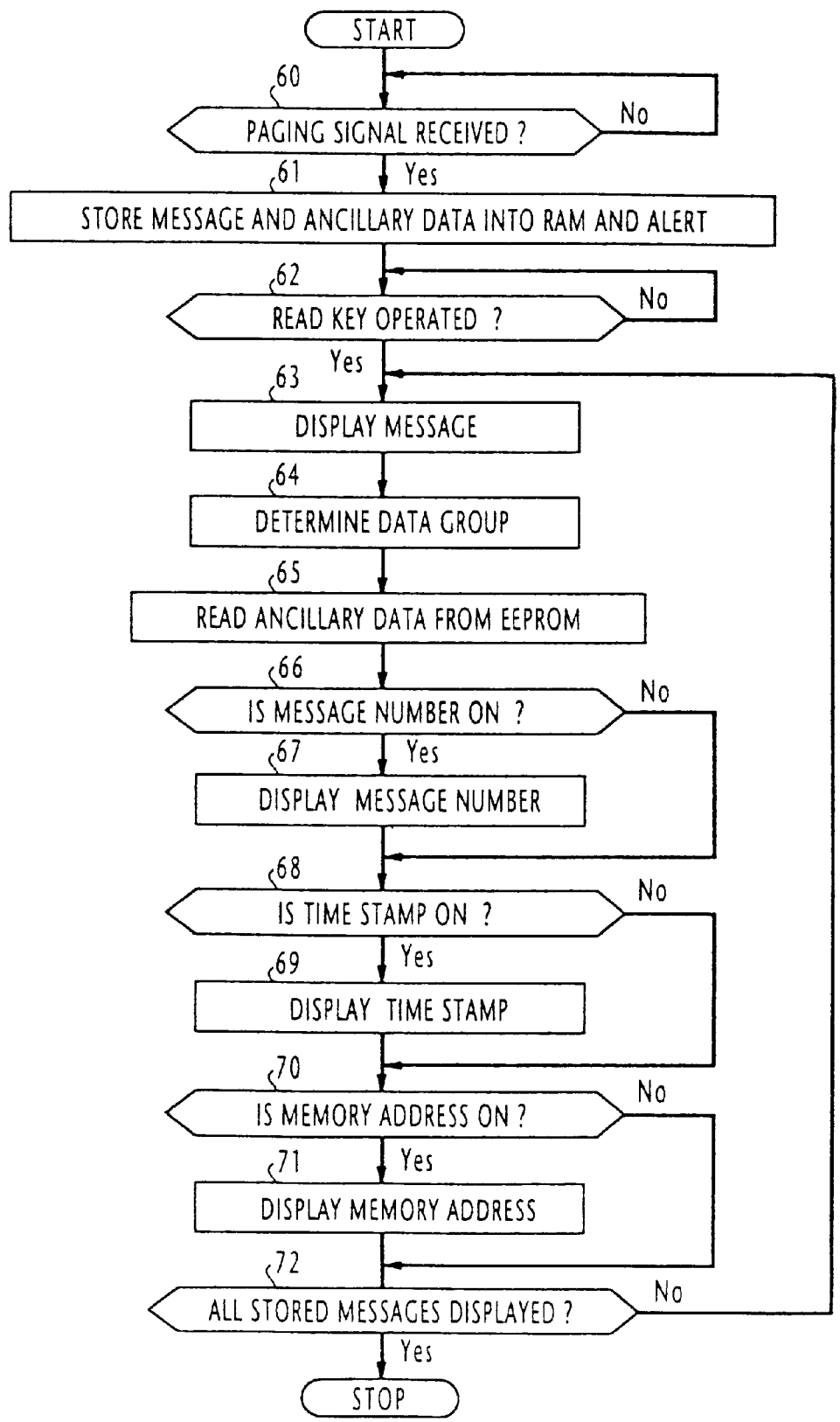
FIG. 6 is a flowchart illustrating the operation of the controller during a page receiving mode.

During a normal page receiving mode, the controller 13 operates in accordance with the flowchart of FIG. 6. When a paging signal is received, the received calling address codeword is checked with the pager's calling addresses stored in the EEPROM 12 and if There is a corresponding address in the memory 12 (step 60), flow proceeds to step 61 to alert the user and store the received message and the accompanying ancillary data into the RAM 14 in a position specified by the memory address of the ancillary data. When the user operates the read key (step 62), flow proceeds to step 63 to scan the RAM 14 and display one of the stored message on LCD 16. At step 64, the controller 13 classifies the stored message as one of the data groups according to the calling address of the stored message and, at step 65, reads the contents of the EEPROM 12 from an entry corresponding to the classified data group (see FIG. 5). Flow proceeds to step 66 to check to see if the message number item of the read entry is "on". If so, flow proceeds to step 67 display the message number of the stored message on LCD 16 and proceeds to step 68. If the message number item is determined to be "off", flow proceeds from step 66 to step 68. At step 68, the controller determines whether the time stamp item is "on" and, if so, flow proceeds to step 69 to display the time stamp of the message, and proceeds to step 70. If the time stamp item is determined to be "off", flow proceeds from step 68 to step 70. At step 70, the controller checks to see if the memory address is "on" and, if so, flow proceeds to step 71 to display the memory address of the stored message. When the memory address is displayed at step 71 or if the display of memory address is determined to be "off" at step 70, flow proceeds to step 72 to determine whether all messages stored in the RAM 14 have been displayed. If so, flow returns to step 63 to repeat the same process on the next message. If all the stored messages have been displayed, flow proceeds to the end of the routine.

What is claimed is,:

1. A radio display pager having a plurality of calling addresses, comprising:

receiver means for receiving a paging signal comprising one of the calling addresses, a message which is classified as one of a plurality of data groups according to said calling addresses, and a plurality of ancillary data items each corresponding to one of plurality of ancillary data groups;

display means;

a random-access memory;

at least one manually operated key;

a management table; and control means responsive to an operation of said at least one manually operated key, during a setting mode, for (a) providing a display of said data groups on said display means to allow each one of the displayed data groups to be selected by a user, (b) providing a display of the ancillary data groups for a selected data group on said display means to allow each of the displayed ancillary data groups to be selected by the user, (c) providing a display of ON/OFF indications for each of the ancillary data groups on said display means to allow the user to select an ON/OFF state for each of the ancillary data groups, and (d) storing the ON/OFF state for each of the ancillary data groups in said management table in a location which corresponds to the selected data group, said control means being responsive to receipt of said paging signal, during a page receiving mode, for (e) storing a message and ancillary data items contained in the received paging signal into said random-access memory, (f) identifying one of said data groups which corresponds to the stored message, (g) providing a display of the stored message on said display means, and (h) providing a display of the stored ancillary data items of the received paging signal in accordance with the ON/OFF states of the ancillary data groups stored in a location of said management table which corresponds to the identified data group.

2. The radio display pager of claim 1, wherein said ancillary data items comprise a time stamp.

3. The radio display pager of claim 1, wherein said ancillary data items comprise a message number.

4. The radio display pager of claim 1, wherein said ancillary data items comprise a memory address.

5. The radio display pager of claim 1, wherein said management table comprises an electrically erasable programmable read only memory for storing the ON/OFF states of said ancillary data groups.

6. The radio display pager of claim 1, wherein said control means provides for selection of said ON/OFF states for each of the selected ancillary data groups without contacting a service provider or connecting the pager to an external device.

7. A method for displaying message for a radio display pager having a plurality of calling addresses, the pager comprising a receiver for receiving a radio paging signal comprising one of the calling addresses, a message which is classified as one of a plurality of data groups according to the calling addresses, and a plurality of ancillary data items each corresponding to one of a plurality of ancillary data groups, said pager comprising display means, a random-access memory, a management table, and at least one manually operated key, a method comprising the steps of:

a) displaying said data groups on said display means in response to an operation of said at least one manually operated key to allow each of the displayed data groups to be selected by a user;

b) displaying the ancillary data groups for a selected data group on said display means to allow each of the displayed ancillary data groups to be selected by the user;

c) displaying ON/OFF indications of the selected ancillary data item on said display means to allow the user to determine an ON/OFF state for each of the ancillary data groups;

d) storing the determined ON/OFF state of each of the selected ancillary data groups in a location of said management table which corresponds to the selected data group;

e) receiving said paging signal, during a page receiving mode, and storing a message and ancillary data items contained in the received paging signal in said random-access memory;

f) identifying one of the data groups which corresponds to the stored message;

g) displaying the stored message on said display means; and h) displaying the stored ancillary data items in accordance with the ON/OFF states of the ancillary data groups stored in a location of said management table which corresponds to the identified data group.

8. The method of claim 7, wherein said ancillary data items comprise a time stamp.

9. The method of claim 7, wherein said ancillary data items comprise a message number.

10. The method of claim 7, wherein said ancillary data items comprise a memory address.

11. The method of claim 7, wherein step (c) further comprises displaying ON/OFF indications of the selected ancillary data groups to allow the user to determine an ON/OFF state for each of the ancillary data groups without contacting a service provider or connecting the pager to an external device.

12. A radio display pager comprising:

a receiver for receiving a paging signal comprising a calling address, a message, and a plurality of ancillary data items each corresponding to one of plurality of ancillary data groups;

display means;

a random-access memory;

at least one manually operated key;

a management table; and control means responsive to an operation of said at least one manually operated key, during a setting mode, for (a) providing a display of the ancillary data groups on said display means to allow each of the displayed ancillary data groups to be selected by the user, (b) providing a display of ON/OFF indications for each of the ancillary data groups on said display means to allow the user to select an ON/OFF state for each of the ancillary data groups, and (c) storing the ON/OFF state of each of the ancillary data groups in said management table, said control means being responsive to receipt of said paging signal, during a page receiving mode, for (d) storing a message and ancillary data items contained in the received paging signal into said random-access memory, (e) providing a display of the stored message on said display means, and (f) providing a display of the stored ancillary data items of the received paging signal in accordance with the ON/OFF states of the ancillary data groups stored in said management table.

13. A method for displaying message in a radio display pager comprising a display, a random-access memory, a management table, at least one manually operated key, and a receiver for receiving a radio paging signal comprising a calling address, a message, and a plurality of ancillary data items each corresponding to one of a plurality of ancillary data groups, said pager comprising, a method comprising the steps of:

a) displaying the ancillary data groups on said display to allow each of the displayed ancillary data groups to be selected by the user;

b) displaying ON/OFF indications of the selected ancillary data item on said display to allow the user to determine an ON/OFF state for each of the ancillary data groups;

c) storing the determined ON/OFF state of each of the selected ancillary data groups in said management table;

d) receiving said paging signal, during a page receiving mode, and storing a message and ancillary data items contained in the received paging signal in said random-access memory;

e) displaying the stored message on said display; and f) displaying the stored ancillary data items in accordance with the ON/OFF states of the ancillary data groups stored in said management table.

* * * * *